United States Patent [19]

Canning et al.

[11] Patent Number: 4,551,390
[45] Date of Patent: Nov. 5, 1985

[54] METHOD OF MOLDING MULTI-PLY POLYMERIC COMPOSITES

[75] Inventors: John L. Canning, Newark; John F. Kay, Columbus, both of Ohio

[73] Assignee: Owens-Corning Fiberglas Corporation, Toledo, Ohio

[21] Appl. No.: 492,869

[22] Filed: May 9, 1983

Related U.S. Application Data

[62] Division of Ser. No. 310,555, Oct. 13, 1981, Pat. No. 4,404,261.

[51] Int. Cl.[4] .................................................. B32B 9/00
[52] U.S. Cl. .................................... 428/431; 428/325; 428/392; 428/482; 156/242; 264/510; 264/101; 264/255
[58] Field of Search .............. 428/480, 325, 392, 431, 428/482; 156/242; 264/510, 101, 202, 255

[56] References Cited

U.S. PATENT DOCUMENTS

| | | | |
|---|---|---|---|
| 3,772,241 | 11/1973 | Kroekel | 525/49 |
| 3,883,612 | 5/1975 | Pratt et al. | 525/170 |
| 4,379,801 | 4/1983 | Weaver et al. | 428/480 |
| 4,399,179 | 8/1983 | Minami et al. | 428/480 |
| 4,404,261 | 9/1983 | Canning et al. | 428/480 |
| 4,405,400 | 9/1983 | Petersen-Hoj | 428/480 |

Primary Examiner—Edith Buffalow
Attorney, Agent, or Firm—Ronald C. Hudgens; Greg Dziegielewski; Bryan H. Davidson

[57] ABSTRACT

This invention pertains to a method to permit the molding of a plurality of plies of polymeric compositions into an integral molded object having a minimum number of internal flaws and, therefore, improved properties. The plies are positioned in contiguous relationship, and the initiation of the polymerization reactions is controlled by selecting catalyst systems which substantially simultaneously initiate polymerization in each of the plies to prevent the development of curing seams at the points of contact between the plies.

6 Claims, 5 Drawing Figures

METHOD OF MOLDING MULTI-PLY POLYMERIC COMPOSITES

This is a division of application Ser. No. 310,555 filed Oct. 13, 1981, now U.S. Pat. No. 4,404,261.

TECHNICAL FIELD

This invention pertains to the field of molding compounds.

BACKGROUND OF THE INVENTION

The molding of polymeric composites such as sheet molding compounds and bulk molding compounds is well known. Generally, such polymeric composites contain glass fiber reinforced polyester-based resins, filled or unfilled, which crosslink by a polymerization reaction which takes place most usually under heat and pressure. Such sheet molding compound material is commonly prepared and stored between flexible polymeric film layers in the form of plies on rolls or continuously folded into large storage containers for the duration of the chemical thickening or maturation period before being molded. In preparation for the molding process, the plies frequently are cut into the shapes and dimensions desired for proper placement into the mold. Although the plies may be molded individually, when objects of greater thickness than that produced by the thickness of an individual ply are to be formed, it is conventional to pile the plies in contiguous relationship and to mold the thicker object therefrom.

However, in such instances, and particularly when two or more plies are so used, and when all the plies are substantially identical, certain deficiencies in the molded part result. These involve the existence of curing seams between the various plies, the seams existing because no melding of the plies occurs at their contact points. This failure to meld occurs principally due to unlike curing initiation occurring among the individual plies inasmuch as the individual curing fronts proceed inwardly from each ply, or from the heated mold surface, with the result that when the individual curing fronts meet at or near the ply edges, a curing seam is created. The presence of such seam, or seams, weakens the molded part principally by providing stressed or slippage surfaces at such curing seams along which surface shear can occur; thus, the shear strength of the part is reduced.

Traditionally, comprssion molding of parts having cross sections greater than 0.25 inch was accomplished by varying the mold cycle time, molding temperature, preheating the SMC preform, or the cut and prepared charge, or by employing a post cycle cooling schedule. The decrease in mold cycle time, a prime factor in the part processing cost, is an attractive target. Unfortunately, in practice, a compromise is made between mold cycle time and the ultimate properties obtained in the thick section. In fact, effective translation of thin section properties, especially tensile and shear strengths, to the thick cross section is seldom accomplished.

There has now been discovered a solution to this problem. The solution involves employing as the plies a series of moldable polymeric composites formulated to "co-cure" by arranging the plies such that the material with the lowest polymerization initiating temperature is positioned centermost of the plurality of plies, with plies having progressively higher initiating temperatures being positioned outwardly therfrom in the order of increasing initiating temperature. Properly evaluated in terms of heat transfer and reaction initiation, when molded, all plies begin to cure at substantially the same time, and curing seams are substantially eliminated.

SUMMARY OF THE INVENTION

In accordance with this invention, molded articles with thicknesses generally greater than one-quarter of an inch are produced essentially without internal defects. The method of this invention provides for the selection of specific catalyst or catalyst systems to be utilized in each ply. The combination of the initiating temperature of the catalyst systems, as obtained from a novel interpretation of the exotherm curve test, as defined by The Society of the Plastics Industry, Inc., and the determination of the thickness of the plies required to accommodate the thermal conductivity characteristics of the specific molding compound produces essentially an attainment of concurrent initiation of the crosslinking polymerizations throughout the plies.

This invention involves a method of molding comprising positioning a plurality of plies comprising crosslinking polymeric compositions within a mold, each of the plies comprising a defined catalyst system, these catalyst systems being selected to simultaneously reach their polymerization initiation temperature when molded under heat and pressure, and molding the plurality of plies under heat and pressure for a period sufficient to simultaneously raise the catalyst systems to their polymerization temperatures to crosslink the polymeric compositions and to form a molded object.

That ply having the lowest polymerization initiating temperature is positioned centermost of the plurality of plies and those plies comprising catalysts having progressively higher polymerization initiating temperatures are positioned outwardly from the centermost of the plies.

The method of this invention is applicable to preform wet pour processing, pipe over-wrapping, autoclaving, vacuum bag, and all methods of molding.

The method of this invention can employ material concepts such as thick molding compounds (TMC), bulk molding compounds (BMC) and sheet molding compounds (SMC), and combinations thereof.

The method of this invention is usable in applications where differential flow in a mold is desirable.

In all instances, the invention is applicable to parts of all configurations, including those with ribs where the configuration of the part produces distances from the heat source which would result in different catalyst initiating temperatures.

Similarly, the invention is applicable to the use of a single resin or to a plurality of resins, and particularly to those procedures wherein the thickness of the formed object is greater than $\frac{1}{8}$ inch but less than $\frac{1}{2}$ inch, and preferably greater than $\frac{3}{8}$ inch.

In all instances, the objects will be constructed of plies which can be assembled in the shaping medium or external thereto.

The moldable polymeric compositions are mainly described herein in terms of the components which are primary contributors to the determination of the reaction initiation temperature, that is, those ingredients such as the catalyst or catalysts, the unsaturated polyester, the monomer or monomers, and the thermoplastic modifiers, if any, which influence the initiation temperature and the reactivity rate, and the fillers, which, together with the former ingredients affect the heat transfer properties in a major way. In accordance with known practice, the moldable polymeric compositions may also include additional appropriate ingredients including, for example, inhibitors, fire retardants, lubricants, pigments, mold release agents, wetting agents, reinforcements, thickening agents, and the like.

The method of this invention pertains to any polymeric resin moldable under heat and pressure, during which molding, polymerization takes place by catalytic action and which resin has a determinable reactivity. This invention is principally concerned with polymerizable resinous compositions which can be filled with particulate matter and reinforced with glass fiber. Most frequently, these resins are employed in the form of sheet molding compounds or bulk molding compounds and will be referred to hereinafter as "molding compounds". They will include all unsaturated polyester resinous compositions and modifications thereof as disclosed in U.S. Pat. No. 3,772,241 to Charles H. Kroekel, which disclosure is included herein by reference. Resins also of particular use are those described in U.S. Pat. No. 3,883,612 to Pratt et al.

By plies or sheets, is meant moldable portions of polymeric composites which can be placed in substantially contiguous relationship over a desired portion of their surfaces, such contiguous relationship being one wherein heat from one portion is readily transferable to a second portion by virtue of their contact. While this invention is applicable, in its preferred embodiment, to an odd number of plies, it is also applicable to an even number, including two plies of like or unlike properties by the process which is adapted to produce simultaneous curing from the point of juncture of the plies.

It is a principal object of this invention to provide a method to permit the molding of a plurality of plies of polyester molding compounds into an integral molded object without internal flaws. It is a further object to provide molding cycles for such polyester molding compounds which do not require cumbersome and time consuming mold heating and cooling operations, or cost prohibitive processing times at extraordinary mold temperatures. It is an additional object to provide articles of manufacture molded in accordance with a novel method which yields reproducible high quality and improved strength items.

Other objects and advantages and the broad scope of applicability of this invention will be apparent from the following description of the invention and by reference to the related drawings. It should be understood that the description and specific examples which are provided are given by way of illustration only; and that various changes and modifications, which will become apparent to those skilled in the art from the description, are possible within the scope and spirit of the invention.

DETAILED DESCRIPTION OF THE INVENTION

Figure 1:
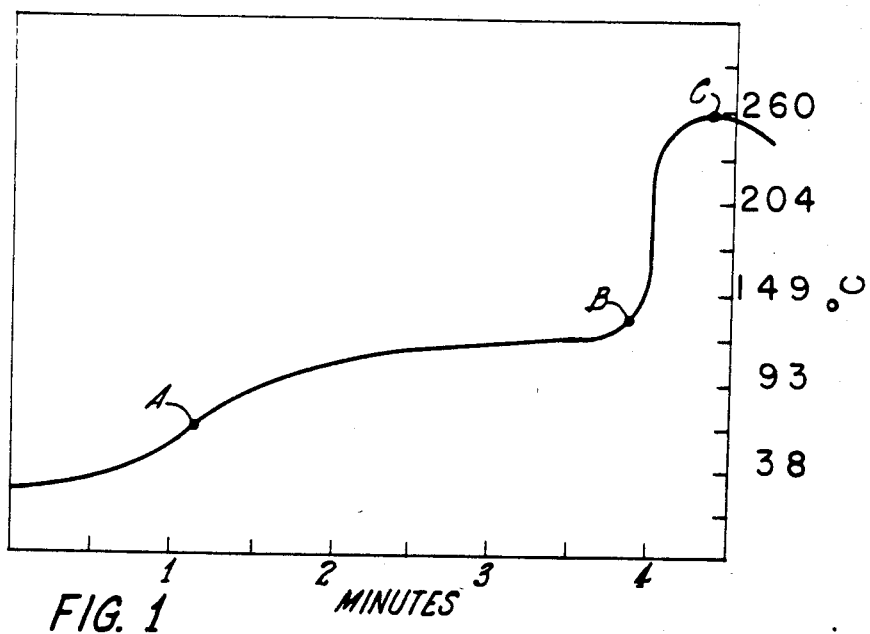
FIG. 1 is a data plot obtained from the "Standard Exotherm Curve" testing per the SPI Procedure.

The method of this invention provides for the selection of catalysts to achieve an essentially simultaneous initiation of the polymerization reaction throughout the part being molded in spite of the existence of concurrent differential temperature zones throughout the part. These zones result primarily as a function of the thickness of the part. Equivalently expressed, they result as a function of the distance of a particular location within the part from the source of external heat.

The major point of novelty of the invention resides in the synergy established by the method of the invention for the temperature or heat flow throughout the molding material and the multiple catalyst selection.

The temperature or heat flow responds to two main thermal conductivity factors:

1. The temperature, heating capacity, and thermal conductivity properties of the mold or heat source surface.
2. The thermal conductivity of the molding compound selected for a particular application.

Factors 1 and 2, above, represent an infinite number of combinations, particularly since the molding compound, per se, offers an infinite number of variations in ingredients and concentrations, but any specific formulation can have its pertinent thermal characteristics readily determined by standard physical testing procedures. Preferably, these data are obtained on the complete molding compound minus only the catalyst. A three-dimensional plot of time, temperature, and distance from the heat source can then be calculated and constructed for the specific combination under consideration. For instance, see G. Menges and H. Derek, Session 23-C, 36th Annual Conference, Reinforced Plastics/Composites Institute, The Society of the Plastics Industry, Inc., Feb. 16-20, 1981.

The catalyst which can be employed are conventional and can be selected from a host of commercially available products. They may be generally classified, but not limited to, aliphatic diacyl peroxides, hydroperoxides, dialkyl peroxides, peroxyketals, aromatic diacyl peroxides, peroxyesters, and "azo" catalysts. The proper catalytic initiating temperatures can be attained by establishing unlike catalysts, per se, in the different plies, or by unlike quantities of the same catalyst or catalyst combinations.

Also includable are promoters conventional within the art, such as cobalt-containing compounds, vanadium-containing compounds, nitrogen-containing compounds, and the like, for example. Promoters, if used, must be included in the testing to determine the polymerization initiating temperatures.

The reactivity of an unsaturated polyester resin is commonly determined according to the procedure designated by the Reinforced Plastics/Composites Division of the Society of the Plastics Industry, Inc. It was published in the report of the 24th Annual Technical Conference, 1969, of the Reinforced Plastics/Composites Division, The Society of the Plastics Industry, Inc. that: "This method is designed for use in determining the 'exotherm curve' of an uncured polyester resin, and covers the 'standard 180° F. exotherm curve,' other standard exotherm curves, and certain variances which may be required for special resins or to supply information which is important for specific applications".

It is a standard practice in the industry to include the following information pertaining to reactivity traits on the data sheets for unsaturated polyester resins:
1. The test bath temperature.
2. The identity and quantity of the catalyst used.
3. The time required for the test resin sample to rise in temperature from 150° F. (65.6° C.) to 10° F. (5.6° C.) above the bath temperature (this time is commonly referred to as "gel time").
4. The time required for the test resin sample to rise in temperature from 150° F. (65.6° C.) to the highest temperature attained during the test (the peak temperature).
5. The numerical value of the peak temperature attained in degrees Fahrenheit.

Referring now to the drawings, shown in FIG. 1 is a typical data plot obtained from the "Standard Exotherm Curve" testing. Point "A" indicates the position at which the test sample reached 150° F (65.6° C.). Point "B," the point at which the test sample had risen to 270° F. (132.2° C.), or ten degrees above the bath temperature of 260° F. (126.7° C.). Point "C," the location at which the test sample had its maximum temperature.

These data would be reported as follows:

SPI Exertherm Test at 260° F. (126.7° C.) with 1% tertiary butyl peroxybenzoate catalyst.

Time from 150° F. (65.6° C.) to 270° F. (132.2° C.) —2.75 minutes.

Time from 150° F. (65.5° C.) to peak —3.25 minutes.

Peak exotherm —495° F. (257.2° C.).

Figure 2:
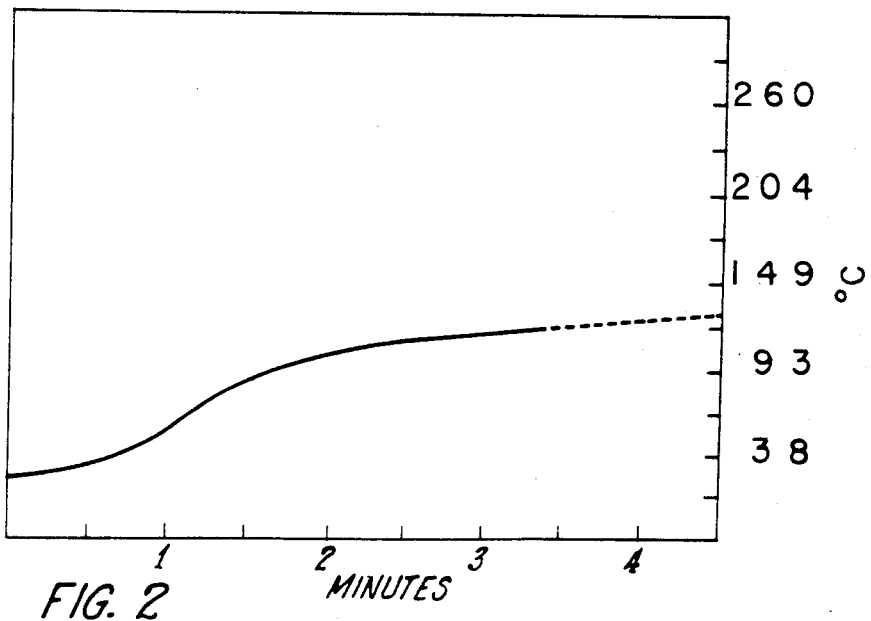
FIG. 2 is a data plot obtianed when the "Standard Exotherm Curve" test procedure is performed in the absence of a catalyst.

In FIG. 2, a typical data plot is shown where the procedure for the Standard Exotherm Curve Test is performed in the absence of a catalyst or similar functioning ingredient. Under these conditions, the test resin sample approaches the bath temperature in an asymptotic relationship. No standard data points are obtained since the test resin sample does not exceed the bath temperature.

Figure 3:
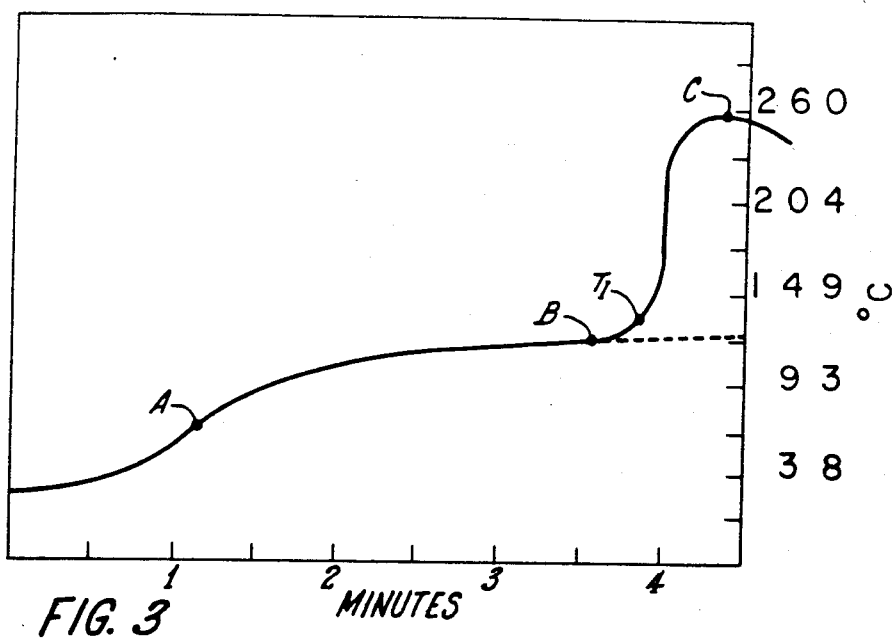
FIG. 3 is a combination of the data plots from FIGS. 1 and 2.

In FIG. 3, the data plots from FIG. 1 and FIG. 2 are combined. This provides a graphic representation of one of the major points of novelty of this invention, namely, the discovery of the interpretation of the polymerization initiating temperature and the significance of its interaction with the variable heat rate input or temperature profile induced primarily by distance from a heat source.

The point at which the data curve from FIG. 1 departs from the data curve from FIG. 2, identified as $T_I$, can only be attributed to the additional thermal input from the initiating crosslinking polymerization since in the absence of a catalyst or other initiating ingredient no such temperature increase occurs. The temperature at which this point $T_I$ is located is termed the initiating temperature for the catalyst or catalyst system used in the test sample. The $T_I$ can easily and readily be located from the data curve for FIG. 1 alone, as $T_I$ can also be defined as the tangent point of the asymptotic portion of the data plot and the first non-lineate section of the temperature rise above the projection of the asymptotic rate.

Thus, it has been found that the SPI test procedure may be utilized to obtain novel information not originally intended or apparent in the test as delineated. This provides a simple, practical, and commonly known and available mode to accomplish the initial step in the method of this invention.

Other and/or more sophisticated practices such as, for example, differential thermal analysis may optionally be employed to yield evidence of the first iritiation of the crosslinking polymerization without departing from the scope of this invention.

Figure 4:
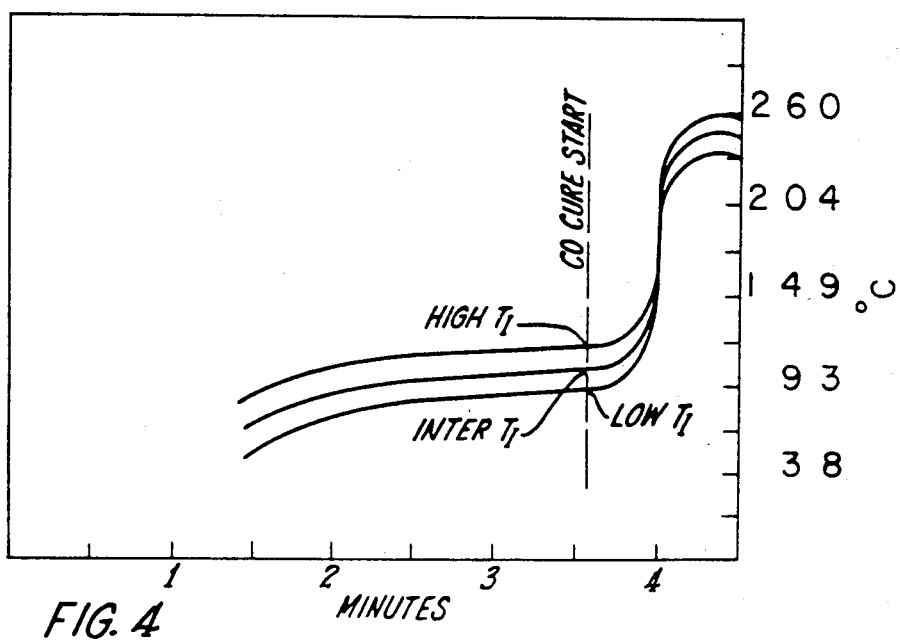
FIG. 4 is a composite data plot of "Standard Exotherm Curve" tests performed with preferred catalysts which have different temperatures of polymerization initiation.

With reference again to FIG. 3, special attention is directed to the rapid rise in the temperature of the catalyzed test sample which occurs generally within a half-minute or less after the test sample data curve has passed through the location of $T_I$. The preferred catalyst selection possesses not only the proper $T_I$ to accommodate the thickness and specific location within the plurality of plies of the ply in which it used, but also generates a rate of crosslinking polymerization, as indicated by the locus of the data curve after $T_I$, essentially the same as those in the other plies. The synchronistical relationship demonstrated in FIG. 4 is thus achieved.

If the thermal expansion forces, and other similar strain inducing elements which can originate during the time span of this rapid temperature rise, are allowed to occur consecutively throughout a plurality of plies, the defects remedied by the preferred method of this invention may occur.

Although numerous combinations and permutations of catalysts and catalyst systems and ply thicknesses and locations are possible, the preferred utilization of the method of this invention exercises precautionary provisions with regard to the temperatures to which the materials may be exposed during compounding, during the maturation period and inventory storage, as well as the duration of exposure to the mold temperature while the molding die is being charged with the assembled plies. For such reasons, the portions of the time/temperature/distance data plots below about 150° F. (65.6° C.) are generally disregarded as impractical for catalyst selection purposes.

Figure 5:
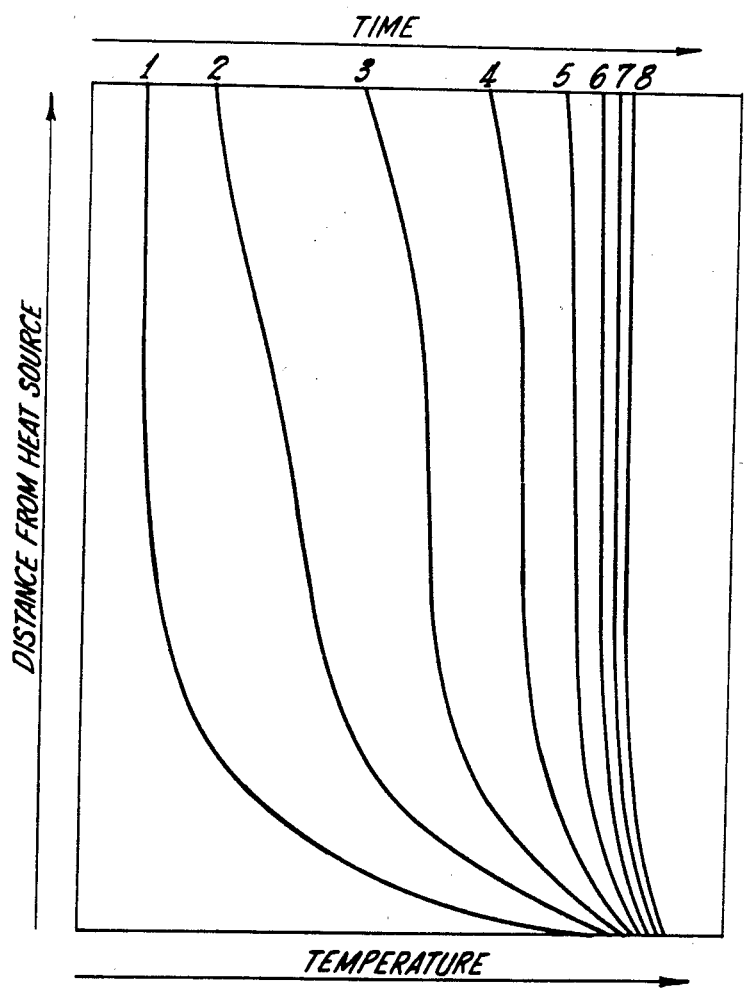
FIG. 5 is a graphic representation of the thickness-temperature relationships which exist throughout the compound at different periods of time.

As can readily be seen by reference to FIG. 5, the major temperature disparity throughout the compound as a function of distance from the heat source occurs shortly after the compound is first exposed to the mold heat. This is primarily due to the rapid conduction of heat from the mold surface into the adjacent material ply compared to the slower conduction through the molding compound ply to ply. After this initial period, the temperature differential, ($\Delta_T$), between the mold surface and the adjacent ply is so effectively reduced that the rate of temperature rise thereafter of the ply adjacent to the mold is analogous to the asymptotic portion of the temperature curve displayed by the test sample in the exotherm curve test as bath temperature is approached. For the more inward plies, once a constant heat flow has been established throughout the compound, a relatively uniform temperature gradient will be maintained across the thickness until reactivity energy begins or until the $\Delta_T$ for a given ply is decreased sufficiently to again induce an asymptotic relationship. In the absence of polymerization, the temperature throughout the compound would ultimately rise to that of the heat source, but only after a prohibitively long time. In the practice of this invention, it is not necessary to achieve temperature uniformly throughout; the provision for multiple temperature zones is intrinsic in the method.

To allow sufficient time for charging the assembled plies into the mold in their proper placement alignment, for the mechanical operation of the closing of the press, and also for the inner plies to attain a temperature above about 150° F. (65.6° C.), which temperature also should be sufficient to reduce the necessary number of temperature zones, and therefore the necessary number of plies to a practical amount, it is often desirable that the outer ply have a $T_I$ approaching the mold temperature usually of between 225° F. (107.2° C.) and 325° F. (162.7° C.) or even slightly, up to about 10° F. (5.6° C.) above the mold temperature to accommodate the half-life characteristics of most commonly used catalysts. The exotherm heat from the adjacent ply may be used to achieve cure initiation essentially simultaneously, particularly since in most instances of the practice of this invention, the outermost plies will have the smallest thickness of all of the plies used in a given compilation of plies.

The defects arising from current practices are attributable to the initiation of curing from the outermost, or heat source surface, side of the part first and then progressively inward. In the practice of this invention, curing is initiated simultaneously throughout, or, in the instance of an outer ply with a $T_I$ above mold temperature, may result in a curing initiation from the center outwardly. Either curing, simultaneously or from the center outwardly, beneficially results in a molded article essentially free of defects such as curing seams.

The method of this invention first involves the determination of $T_I$ values and reactivity rate charts for several catalysts and catalyst combinations when used with the resin selected for the application. While it would be desirable to obtain data to cover the temperature range from about 150° F. to about 350° F. (65.6° C. to about 177° C.) in ten degree Fahrenheit increments, the range of 200° F. to 300° F. (93° C. to about 149° C.) is usually sufficient. Then there is established the temperature differences which may be expected throughout the part at different periods of time, preferably from about three to about seven minutes after application of heat, by the determination of the thermal conductivity of the compound. Then there is the generation of a time/temperature/thickness plot similar to that shown in FIG. 5, by any suitable method such as the direct measurement of temperature change with time at various positions within a test compound sample without catalyst.

As beforementioned, compound temperatures below about 150° F. (65.6° C.) are generally not desirable, and minimum compound temperatures of about 200° F. (93.3° C.) are preferred in order to prevent the number of plies required from being excessive. The time to achieve a minimum compound temperature of about 200° F. (93° C.) is selected as a starting point, and the temperature/thickness profile is examined for uniformity. For example, if in a given instance, in three minutes after the application of heat, a minimum compound temperature of 200° F. (93.3° C.) is reached at a distance from the heat source equivalent to the centerline of the thickness of the part to be molded, that is, the effective thickness of the molding desired, the concurrent temperatures progressing outwardly to the edge are noted. If an edge temperature of 290° F. (143.3° C.) is found, for example, nine plies of 10° F. (5.6° C.) differential will be required; that is, nine different plies which would progressively have 200° F. (93.3° C.), 210° F. (98.9° C.), 220° F. (104.4° C.), and so on up to 290° F. (143.3° C.) for their catalyst initiation temperatures. These plies would differ in their thicknesses as was necessary to coincide with the thickness dimensions equivalent to the ten degree (°F. temperature spans which exist at the time selected. While this would be within the scope of this invention, nine plies might be deemed undesirable.

Additional times such as four minutes, five minutes, and so forth, would be reviewed until a satisfactory compromise between the time and the number of plies to be used was obtained. Thus, the method adapts to individual examples. For each time examined, a different thickness for each ply and a different number of plies usually results.

The mass to be molded is then formed of a series of plies, a different ply being employed for each temperature differential of about 10° F. (5.6° C.). That is, adjacent plies will differ in their catalyst initiation temperature by about 10° F. (5.6° C.) while the temperature difference between the material adjacent the mold, or die, and the material located at the center of the part being molded does not exceed 50° F. (10° C.), and preferably does not exceed 30° F. (−1.1° C.).

Into each ply is incorporated a polymerization catalyst with an initiating temperature corresponding to the temperature which that ply is expected to reach at the time selected.

The plies containing the catalyst are then placed in a contiguous relationship within the mold such that the material with the lowest polymerization initiating temperature is positioned centermost of the plurality of plies, with the plies having higher initiating temperatures positioned outwardly therefrom in order of increasing initiating temperature, and the mold is closed. Molding is conducted under heat, and pressure if necessary. Inasmuch as the initiation temperature in the plies is reached simultaneously, though at different temperatures, a meld of the plies takes place and an article of improved strength is obtained.

The foregoing will become more apparent and better understood by referring to the following examples.

EXAMPLE 1

The following unsaturated polyester resin system/filler mixtures were prepared using a high-speed stirrer equipped with a dispersion blade.

Mixture 1

100 weight parts of an unsaturated polyester resin system made from a dicyclopentadiene propylene maleate unsaturated polyester plus a polyvinyl acetate-methyl methacrylate-acrylic acid terpolymer and styrene.

150 weight parts of a calcium carbonate filler (Snowflake).

1.5 weight parts of tertiary butyl peroxybenzoate catalyst.

Mixture 2

The same as Mixture 1 except for the use of 165 weight parts of calcium carbonate filler (Snowflake) instead of 150 weight parts.

Mixture 3

The same as Mixture 1 except for the use of 180 weight parts of calcium carbonate filler (Snowflake) instead of 150 weight parts.

Mixture 4

The same as Mixture 2 except for the use of a mixed catalyst system of 1.5 weight parts of Trigonox 29B75 plus 0.5 weight parts of Trigonox KSM instead of 1.5 weight parts of tertiary butyl peroxybenzoate.

Mixture 5

The same as Mixture 2 except for the use of a mixed catalyst system of 0.5 weight parts of Lupersol PDO plus 0.5 weight parts of tertiary butyl peroxybenzoate catalyst instead of 1.5 weight parts of tertiary butyl peroxybenzoate catalyst.

Aliquot portions of each of the above mixtures were transferred into new clean 19×150 mm test tubes so that three inches of the test mixture, as measured from the bottom of the test tube to the top of the test mixture, were in each test tube. This procedure is in compliance with the procedure specified by the Society of the Plastics Industry, Inc., for running exotherm curves. Continuing to follow that procedure for each test run, a thermocouple needle and centering device were inserted into the test tube containing the mixture materials, the test tube and needle assembly were placed into a test rack in the heated bath and the exotherm curve obtained. The initiation temperatures were determined by tangency. Three bath temperatures of 260° F., 280° F., and 300° F. (127° C., 138° C., and 149° C.) were used in this testing program as indicated in the following table. The table shows the averages of replicate testing.

TABLE 1

| Mixture Number | Test Bath Temp., °F. (°C.) | Initiation Temp., °F. (°C.) |
| --- | --- | --- |
| 1 | 260 (126.6) | 250 (121.1) |
| 2 | 260 (126.6) | 250 (121.1) |
|   | 280 (137.8) | 245 (118.3) |
|   | 300 (165.5) | 245 (118.3) |
| 3 | 260 (126.6) | 250 (121.1) |
| 4 | 260 (126.6) | 210 (98.9) |
|   | 280 (137.8) | 215 (101.7) |
|   | 300 (165.6) | 210 (98.9) |
| 5 | 260 (126.6) | 220 (104.4) |
|   | 280 (137.8) | 230 (110) |
|   | 300 (165.6) | 225 (107.2) |

In examining the data in Table 1, it can readily be seen by a comparison of the initiating temperatures obtained for mixtures Numbers 1, 2 and 3 at the 260° F. (127° C.) bath temperature that the $T_I$ is relatively unaffected by the weight percent filler contained in the mixture. Also, from a comparison of the $T_I$ obtained on mixture Number 2 at the three test bath temperatures, and similarly on mixtures Numbers 4 and 5, it is apparent that the $T_I$ of a given catalyst or catalyst system when used with a specific resin system, is essentially unchanged as a function of the test bath temperature. By a comparison of the initiating temperatures of mixtures Numbers 1, 2 and 3, individually or collectively, with those for mixtures 4 and/or 5 at a given bath temperature, it can be established that the $T_I$ is a result of the selection of the catalyst or catalyst system. Thus, by the identification of the initiating temperature as a function of the catalyst selection, it is possible to generate the information necessary to select the required catalyst systems to accommodate the temperature differentials anticipated as a result of the "effective thickness" of the molding desired, the thermal conductivity of the instance molding compound, the tool or heat source properties, and the other pertinent temperature factors.

The following example demonstrates the preparation of a molding compound and its use in the method of this invention.

EXAMPLE 2

An unsaturated polyester polymer was synthesized in an ordinary reaction vessel which was equipped with an agitator, a heating means, a condenser, and an inlet for inert gas from the following raw materials:
  10.4 gram mols of propylene glycol (791 grams)
  3.3 gram mols of isophthalic acid (548 grams)
  6.7 gram mols of maleic anhydride (657 grams)
  (Isophthalic acid includes commercial material which may contain up to about 18% of other acid compositions such as terephthalic acid, for example.)

First Stage

The reactor was first charged with all of the propylene glycol (10.4 gram mols; 791 grams) and about 0.1% (2 grams) of dibutyl tin oxide processing catalyst based on the total weight (1966 grams) of all of the materials to be used. The agitation, the heating means, and the inert gas flow were started. When the batch temperature had reached about 300° F. (149° C.), 3.3 gram mols (548 grams) of isophthalic acid were added to the reactor with constant agitation. Heating under inert gas flow was continued until the batch temperature had increased to about 420° F. (216° C.). The batch temperature was maintained at about 420° F. (216° C.) until the acid number had decreased to about 15 or less.

Second Stage

The batch was cooled until a temperature of 300° F. (149° C.) or lower had been reached. Then 6.7 gram mols (657 grams) of maleic anhydride and about 0.01% (0.2 grams) of toluhydroquinone inhibitor based on the total weight (1966 grams) of all of the materials to be used were added to the reactor with constant agitation. The batch temperature was gradually increased to about 410° F. (210° C.) and further processed until an acid number of 30 was reached. The batch was then cooled to about 250° F. (121° C.) and diluted with sufficient styrene monomer to yield a resin mix of two weight parts of unsaturated polyester polymer to one weight part of styrene monomer. A test sample of this final product had a viscosity of 2350 centipoise at 77° F. (25° C. ) and an acid number of 18.7.

Third Stage

A thermoplastic polymer was synthesized from the following monomers:
  71.4 parts of vinyl acetate monomer.
  27.4 parts of methyl methacrylate monomer.
  1.2 parts of acrylic acid.

About 200 parts of demineralized water were heated to 153° F. (67° C.), and 3% of the above monomer mixture containing about 2 weight parts of methyl ethyl ketone (MEK) and 1 weight part of benzoyl peroxide (BPO) were added to the water. The temperature of the aqueous mixture was maintained at 153° F. (67° C.) and supplied with a nitrogen gas sparge. The remaining monomers were added to the aqueous mixture over a period of time and at a steady rate to maintain the batch temperature at about 153° F. (67° C.). After the monomers were added, the batch temperature was raised to 176° F. (80° C.) and held for one hour. The resulting suspended thermoplastic polymer was cooled and partially dried by centrifuging to remove a major portion of the water. The partially dried thermoplastic polymer was then dispersed in styrene monomer and vacuum stripped of the remaining water. The concentration of the thermoplastic polymer was adjusted to 35 weight parts in 65 weight parts of styrene monomer and about 0.01% p-benzoquinone inhibitor per 100 weight parts of the thermoplastic polymer-styrene mixture was added.

Fourth Stage

The final product of Example 2 was blended at room temperature with the final product of Example 3 by charging to a mixing vessel the following:
80 weight parts of Example 2.
20 weight parts of Example 3.

The blend was mildly agitated to form a uniform resinous system with excellent phase stability. The viscosity was 2240 centipoises at 77° F. (25° C.).

Fifth Stage

A sample of the above resin is employed to produce an SMC composed of 35 weight percent resin paste and 65 percent chopped glass roving.

A volume of compound, complete except for catalyst, of constant cross-section is placed in a mold maintained at 270° F. (132.2° C.). Thermocouples are placed at regular distances across the cross-section of the sample and temperature determinations are made with the following results after seven minutes.

| Distance From Mold Surface A, inches | Temperature, °F. (°C.) |
|---|---|
| 0.16 | 260 (126.6) |
| 0.33 | 256 (124.4) |
| 0.5 | 252 (122.2) |
| 0.6 | 248 (120) |
| 0.83 | 244 (117.7) |

Based upon these data, five plies of indicated thickness, are prepared and into each is incorporated a polymerization catalyst having the following initiating temperatures.

| Ply Number | Ply Thickness, in. | Catalyst Kick-Off Temperature, °F. (°C.) |
|---|---|---|
| 1 | 0.110 | 266 (130) |
| 2 | 0.35 | 258 (125.6) |
| 3 | 0.74 | 249 (120.6) |
| 4 | 0.35 | 258 (125.5) |
| 5 | 0.110 | 266 (130) |

The five plies are stacked in the mold in contiguous relationship in the order of initiating temperature decreasing inwardly from the mold. The mold is closed and the plies are molded at a temperature of 270° F. (132° C.) and 1100 psig for a period of seven minutes and held thereafter for thirteen minutes for a total of twenty minutes.

Inspection of the molded part shows essentially no seams between the plies, indicating substantially simultaneous polymerization within all three plies.

Example 3

The SMC formulation was a randomly-oriented chopped glass in a polyester matrix. No filler was used because of the high-glass loading.

A one-inch constant thickness disc 21 inches in diameter was used for molding large volume parts. The thickness of the disc was about one inch and was comprised of an odd number of plies which were molded in oil-heated mold halves coated with a mold release agent.

Eighteen layers were employed. These layers were arranged such that the innermost six layers consisted of the lowest $T_I$ compound and the outer three layers on each side of the stack were the highest $T_I$ material. Three intermediate $T_I$ layers were placed between the innermost and outermost plies.

While 18 layers were employed, as a practical matter of grouping, these equated to but 3 plies as concerns catalyst type or concentrations.

Ply compositions were as follows:

| | | Ply, weight parts | | |
|---|---|---|---|---|
| Function | Component | Low $T_I$ | Intermediate $T_I$ | High $T_I$ |
| Resin | Resin of Ex. 2 | 100 | 100 | 100 |
| Catalyst | t-butyl peroxybenzoate | 1.7 | 0.6 | 0.5 |
| Initiator | t-butyl peroctoate | 0.7 | 0.1 | 0 |
| Thickener | Magnesium oxide | 5 | 5 | 5 |

Such methods of molding have produced materials of superior tensile properties. The following data is presented relative to structural sheet molding composed of chopped glass in polyester resin for one-inch and two-inch reinforced molded objects.

TABLE I

| Structural Sheet Molding Compound* Properties | | |
|---|---|---|
| | 1-Inch | 2-Inch |
| Tensile Strength (ksi) | 36.7 | 46.5 |
| Tensile Modulus (msi) | 2.40 | 2.44 |
| Tensile Elongation Failure (%) | 2.27 | 2.49 |
| Poisson's Ratio | 0.26 | 0.26 |
| Density (lb/in$^3$) | 0.064 | 0.062 |

*65 weight percent chopped glass (one or two inch chopped length) and 35 weight percent polyester based resin-paste.

It will be evident from the foregoing that various modifications of this invention can be employed. Such, however, are considered within the scope of the invention.

I claim:

1. An article comprising a plurality of plies including at least an inner ply and a pair of outer plies positioned in contacting contiguous relationship over a desired portion of their surfaces, wherein said inner and pair of outer plies each include an unsaturated, crosslinkable polyester, a monomer and a polymerization catalyst system, the catalyst system in said inner ply exhibiting a lower initiation temperature as compared to initiation temperatures of the catalyst system in each said pair of outer plies, wherein the catalyst system in each of the plies substantially simultaneously reach their respective polymerization initiation temperatures to crosslink the polyesters within each ply when the plies are molded at elevated temperatures and pressures; wherein said catalyst systems are selected from the group consisting of aliphatic diacyl peroxides, hydroperoxides, dialkyl peroxides, peroxyketals, aromatic diacyl peroxides, peroxyesters and "azo" catalyst.

2. The article of claim 1 in which at least one of said plies further comprises glass fibers.

3. The article of claim 1 wherein said plies further comprise polymerization promoters, fillers and colorants.

4. The article of claim 1 in which the polymerization initiation temperature of the catalyst system of said inner ply is about 10° F. less than the initiation temperatures of each catalyst system of said pair of outer plies.

5. The article of claim 1 in which each ply comprises a plurality of layers.

6. The article of claim 1 wherein the polymeric composition of said plies further comprise different catalyst systems or different quantities of catalyst systems.

* * * * *